US008189951B2

(12) United States Patent
Toji et al.

(10) Patent No.: US 8,189,951 B2
(45) Date of Patent: May 29, 2012

(54) VIDEO SIGNAL DISPLAY DEVICE, VIDEO SIGNAL DISPLAY METHOD, STORAGE MEDIUM, AND INTEGRATED CIRCUIT

(75) Inventors: Bunpei Toji, Gifu (JP); Shinya Kiuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 394 days.

(21) Appl. No.: 12/667,936

(22) PCT Filed: May 14, 2009

(86) PCT No.: PCT/JP2009/002128
§ 371 (c)(1),
(2), (4) Date: Jan. 6, 2010

(87) PCT Pub. No.: WO2009/141980
PCT Pub. Date: Nov. 26, 2009

(65) Prior Publication Data
US 2010/0226536 A1 Sep. 9, 2010

(30) Foreign Application Priority Data
May 21, 2008 (JP) ................................. 2008-133381

(51) Int. Cl.
G06K 9/40 (2006.01)
(52) U.S. Cl. ....................................................... 382/274
(58) Field of Classification Search .................. 382/118, 382/167, 173, 274, 282, 291
See application file for complete search history.

(56) References Cited

U.S. PATENT DOCUMENTS

| 4,090,110 | A | 5/1978 | Ogawa et al. |
| 4,731,865 | A | 3/1988 | Sievenpiper |
| 6,791,566 | B1 | 9/2004 | Kuratomi et al. |
| 6,850,249 | B1 * | 2/2005 | Gu ................................. 345/623 |
| 2005/0232356 | A1 * | 10/2005 | Gomi et al. .............. 375/240.16 |
| 2007/0116357 | A1 * | 5/2007 | Dewaele ....................... 382/173 |
| 2008/0174605 | A1 | 7/2008 | Kiuchi et al. |

FOREIGN PATENT DOCUMENTS

| JP | 9-233423 | 9/1997 |
| JP | 2002-55675 | 2/2002 |
| JP | 2002-72951 | 3/2002 |
| JP | 2002-116728 | 4/2002 |
| JP | 3733165 | 10/2005 |
| JP | 2006-262000 | 9/2006 |
| JP | 2007-104378 | 4/2007 |
| JP | 2007-298693 | 11/2007 |
| JP | 2008-180756 | 8/2008 |

OTHER PUBLICATIONS

International Search Report issued Aug. 18, 2009 in International (PCT) Application No. PCT/JP2009/002128.

* cited by examiner

Primary Examiner — Phuoc Tran
(74) Attorney, Agent, or Firm — Wenderoth, Lind & Ponack, L.L.P.

(57) ABSTRACT

A technical problem is to inhibit variation in the correction between frames of a moving image while maintaining a correction amount of the overall image. The video signal display device has an attraction point determination portion (104), a corrected center position storage portion (105), a corrected center position determination portion (106), a correction parameter creation portion (107), and a correction portion (108), and performs correction such that the corrected center position is gradually moved toward an attraction point. The video signal display device achieves the same effect as methods that suppress correction variability by adjusting the correction amount, while also inhibiting correction variability.

19 Claims, 6 Drawing Sheets

VIDEO SIGNAL DISPLAY DEVICE, VIDEO SIGNAL DISPLAY METHOD, STORAGE MEDIUM, AND INTEGRATED CIRCUIT

TECHNICAL FIELD

The invention relates to video signal display devices, and related technologies, that allow for a reduction in power consumption by an electric device, and that allow for an enhanced sense of brightness at a same degree of power consumption.

BACKGROUND ART

People have a strong tendency to focus their attention on the center portion of the screen (display screen) of a display device that is displaying a video signal (or image signal). This has led to methods for maintaining the brightness of the center portion of the display screen of the display device while lowering the brightness of the relatively unnoticed surrounding display screen, so as to maintain the sense of brightness of the display screen while concomitantly cutting down on the power that is used by the display device.

These methods achieve a reduction in power consumption by correcting the input video signal so that the luminance drops from about the center of the display screen toward its periphery. Patent Citation 1 is a representative example of such a method.

Patent Citations 2 and 3 are examples of methods for dynamically controlling the extent of luminance drop according to the input video signal, so as to yield further reductions in power consumption.

The technology disclosed in Patent Citation 4 is an example of a technology that, while not intended to reduce power consumption, involves performing appropriate correction of input video (images) according to the state of the input video (images). The technology that is disclosed in Patent Citation 4 is for performing correction based on the content (state) of the input video signal by detecting areas that include images of people's faces from the image data that are formed by the input video (image) signal, and then changing the correction information (correction strength, etc.) based on the result of that detection.

The technology of Patent Citation 4 is primarily intended for the processing of still images, but it can also be adopted for moving images as well. However, adopting the technology of Patent Citation 4 for moving images raises new issues. That is to say, adopting the technology of Patent Citation 4 for moving images usually leads to detection that is incomplete and by and large results in a detection rate that is less than 100%. Adopting the technology of Patent Citation 4 for moving images therefore creates a situation in which there are frames in which an object that is to be detected can actually be detected and those in which it cannot be detected. This leads to variability in the correction outcome when correction is performed according to these detection results. Ultimately, moving images that are processed using the technology of Patent Citation 4 are unstable and may flicker, for example.

In response to this problem, Patent Citation 5, for example, discloses a device that inhibits the sense of instability in a moving image by calculating the current correction information (the correction information that is applied to the current frame) using the correction information from past frames as well. In other words, the technology that is disclosed in Patent Citation 5 inhibits variation in the correction between frames by not only calculating correction information from the information that is based on the detection result but also performing processing so as to minimize change from the correction information from prior frames.

CITATION LIST

Patent Literature

Patent Citation 1: JP 2002-55675A
Patent Citation 2: JP 2002-116728A
Patent Citation 3: JP 2002-72951A
Patent Citation 4: JP 3733165B
Patent Citation 5: JP 2006-262000A

DISCLOSURE OF INVENTION

Technical Problem

However, the prior art does not always allow a large corrective effect (appropriate corrective effect) to be obtained because the correction information (correction strength, etc.) changes (for example, the correction strength increases or decreases) according to the detection result.

The present invention solves the foregoing issues with the conventional art, and it is an object thereof to provide a video signal display device, a video signal display method, a program, and an integrated circuit, which can reliably perform appropriate correction while appropriately maintaining correction information (correction strength, etc.) and at the same time inhibiting unwanted effects that may occur in the processed image due to variability in the correction process between the frames of a moving image.

Technical Solution

A first aspect of the invention is a video signal display device for displaying a moving image that is made from a plurality of images, and which is provided with an attraction point determination portion, a corrected center position storage portion, a corrected center position determination portion, a correction parameter creation portion, a correction portion, and a display portion. The attraction point determination portion determines an attraction point in a current image that is one of the images that make up the moving image. The corrected center position storage portion holds the coordinates of the corrected center point of the previous image, which is the image that is prior to the current image. The corrected center position determination portion determines a corrected center point in the current image, based on the attraction point that is determined by the attraction point determination portion and the corrected center point of the previous image that is held in the corrected center position storage portion.

The correction parameter creation portion creates a correction parameter based on the correction center point of the current image. The correction portion corrects the current image based on the correction parameter. The display portion displays the image that has obtained by correction by the correction portion. The corrected center position determination portion sets a point on the image that is between the attraction point and the corrected center point of the previous image, and whose distance on the image from the corrected center point of the previous image is equal to or less than a limit value, as the corrected center point of the current image. The corrected center position storage portion stores the coordinates of the corrected center point of the current image that has been determined by the corrected center position determination portion.

With this video signal display device, the corrected center of the current image (current frame image, for example) is determined taking into account the relationship between the attraction point and the corrected center of the previous image (previous frame image, for example), and thus it is possible to inhibit sudden changes in the moving image due to correction shifts between images (between frames, for example). The moving image display device thus can perform appropriate correction even for moving images in which there are sudden changes between frames, and can always obtain appropriate moving images. The video signal display device also can perform control such that images regions that people readily continue to feel bright while lowering the brightness (lowering the luminance, for example) of other image regions, and thus the device can reduce power consumption.

It should be noted that here, the "current image" refers to the image that is currently slated to be processed by the video signal display device, and for example corresponds to the current frame image (present frame image). Further, the "previous image" is an image that is temporally prior to the current image and if, for example, a current image is the current frame image, then the previous image would be the frame image of one frame prior.

A second aspect of the invention is the first aspect of the invention, in which the attraction point determination portion detects a predetermined image region to be detected from the current image and determines the attraction point based on the image region to be detected that has been detected.

Thus, it is possible to choose an attraction point based on image regions for detection that are readily noticed by viewers.

A third aspect of the invention is the second aspect of the invention, in which the image region to be detected is an image region that includes faces or portions of faces.

Thus, the attraction point can be determined based on image regions that include faces or portions of faces, which are image regions for detection that are readily noticed by viewers. As a result, images that have been corrected by the video signal display device become more appropriate images, and the amount of power that is used is effectively reduced.

A fourth aspect of the invention is the second aspect of the invention, in which the image region to be detected is an image region that includes characters.

Thus, the attraction point can be determined based on image regions that include characters (particularly telop characters or the like, which easily garner a viewer's attention), which are image regions for detection that are readily noticed by viewers. As a result, images that have been corrected by the video signal display device become more appropriate images, and the amount of power that is used is effectively reduced.

A fifth aspect of the invention is the second aspect of the invention, in which in a case where the attraction point determination portion has detected a plurality of image regions to be detected, the attraction point determination portion determines that the attraction point is a single point on the image based on the plurality of image regions to be detected that have been detected.

Thus, a single attraction point can be determined when a plurality of image regions for detection that are readily noticed by viewers have been detected, and thus the video signal display device can perform appropriate correction.

A sixth aspect of the invention is the fifth aspect of the invention, in which in a case where the attraction point determination portion has detected a plurality of image regions to be detected, the attraction point determination portion determines that the attraction point is a single point on the image based on at least one of size, number, and positional relationship, of the plurality of image regions to be detected that have been detected.

Thus, a single point with a high degree of attraction can be set as the attraction point based on a plurality of detection results.

A seventh aspect of the invention is any one of the first through sixth aspects of the invention, in which if the attraction point determination portion does not detect an image region to be detected, then the attraction point determination portion chooses as the attraction point a point on the image that corresponds to a specific position on the display screen that is formed by the image.

Thus, an attraction point can be determined even if no image regions for detection that are readily noticed by viewers are detected, and thus the video signal display device can perform appropriate correction.

An eighth aspect of the invention is the seventh aspect of the invention, in which the attraction point determination portion sets the point on the image that corresponds to approximately center of the display screen that is formed by the image as an initial position of the attraction point.

Thus, a corrected result that is centered around the approximate center of the screen, which generally tends to draw viewers' attention, can be obtained even no factors that draw attention are detected.

A ninth aspect of the invention is any one of the first through eighth aspects of the invention, in which if where the moving image is video with 60 fps (frames per second), then the corrected center position determination portion sets the limit value to a fixed value that is 1 or more pixels but not more than 4 pixels.

Thus, the video signal display device can perform even more appropriate correction. In particular, if the screen size that is displayed by the display portion is 42 inches (length of diagonal) and its resolution is 1024 horizontal pixels by 768 vertical pixels, then movement of the corrected center can be made hardly noticeable by moving the corrected center at a rate of 4 pixels or less per frame in the video that is displayed by the video signal display device.

A tenth aspect of the invention is any one of the first through eighth aspects of the invention, further provided with a limit value determination portion for changing the limit value based on the current image.

An eleventh aspect of the invention is the tenth aspect of the invention, in which the limit value determination portion changes the limit value based on scene change information.

Thus, the video signal display device allows the corrected center to be instantly moved to the attraction point during scene changes in which variation in the correction does not stand out.

A twelfth aspect of the invention is the tenth aspect of the invention, in which the limit value determination portion changes the limit value according to a distance on the image between the attraction point of the current image and the corrected center point of the previous image.

Thus, with this video signal display device, it is possible to give acceleration (negative acceleration) to the movement of the corrected center (in other words, the movement speed of the corrected center is slowed as it approaches the attraction point), and rapid tracking becomes possible even if there is significant movement in the position to be corrected on the screen.

A 13th aspect of the invention is the tenth aspect of the invention, in which the limit value determination portion changes the limit value according to a position of the attraction point on the display screen that is formed by the image.

Thus, with this video signal display device, it is possible to change the speed of movement depending on whether movement is toward the approximate screen center or away from the approximate screen center, and the approximate screen center can be preferentially chosen as the corrected center if the yield of face detection is poor, for example.

A 14th aspect of the invention is the tenth aspect of the invention, in which the limit value determination portion increases the limit value the larger a degree of attraction, which is a measure that expresses a degree by which a viewer's attention is captured, is on the display screen that is formed by the image.

Thus, the speed of movement of the corrected center position can be changed according to the ability to draw a viewer's attention.

A 15th aspect of the invention is the 14th aspect of the invention, in which the attraction point determination portion detects a predetermined image region to be detected from the current image, and calculates the degree of attraction based on at least one of size, number, position on the image, and detection reliability, of the image region to be detected that has been detected. The limit value determination portion changes the limit value based on the degree of attraction that has been calculated by the attraction point determination portion.

Thus, this video signal display device allows the corrected center position to be moved to regions that are readily noticed even more quickly. In other words, this configuration allows for correction based on the degree of attraction, which is detected.

A 16th aspect of the invention is any one of the first through eighth aspects of the invention, in which the corrected center position determination portion changes the limit value according to a correction strength that is used by the correction parameter creation portion for creating the correction parameter.

Thus, the video signal display device can inhibit movement of the corrected center when there is a large gradient over which movement of the corrected center would be easily noticed (when there is a large drop in the signal), for example.

This configuration also allows for the speed at which the corrected center is moved to be increased in cases where movement will not stand out. Put differently, it is possible to perform control such that, movement of the corrected center is not noticeable when the correction strength is low and thus the position of the corrected center can be moved quickly, whereas movement in the corrected center is noticed if the correction strength is high and thus the position of the corrected center is moved slowly.

The 17th aspect of the invention is a video signal display method of displaying a moving image that is made from a plurality of images that includes an attraction point determining step, a corrected center position obtaining step, a corrected center position determining step, a correction parameter creation step, a correction step, and a display step.

The attraction point determining step is for determining an attraction point in a current image, which is a single image that makes up the moving image. The corrected center position obtaining step is for obtaining coordinates of a corrected center point of a previous image, which is an image prior to the current image. The corrected center position determining step is for determining a corrected center point in the current image, by setting a point on the image that is between the attraction point and the corrected center point of the previous image, and whose distance on the image from the corrected center point of the previous image is less than or equal to a limit value, as the corrected center point of the current image. The correction parameter creation step is for creating a correction parameter based on the corrected center point of the current image. The correction step is for correcting the current image based on the correction parameter. The display step is for displaying the image that is obtained by correction in the correction step.

Thus, it is possible to achieve a video signal display method that yields the same effects as the first aspect of the invention.

An 18th aspect of the invention is a storage medium storing a program executable on a computer that displays video signals and that displays a moving image that is made from a plurality of images. The program causes the computer to perform an attraction point determining step, a corrected center position obtaining step, a corrected center position determining step, a correction parameter creation step, a correction step, and a display step.

The attraction point determining step is for determining an attraction point in a current image, which is a single image that makes up the moving image. The corrected center position obtaining step is for obtaining coordinates of a corrected center point of a previous image, which is an image prior to the current image. The corrected center position determining step is for determining a corrected center point in the current image, by setting a point on the image that is between the attraction point and the corrected center point of the previous image, and whose distance on the image from the corrected center point of the previous image is less than or equal to a limit value, as the corrected center point of the current image. The correction parameter creation step is for creating a correction parameter based on the corrected center point of the current image. The correction step is for correcting the current image based on the correction parameter. The display step is for displaying the image that is obtained by correction in the correction step.

Thus, it is possible to achieve a storage medium storing a program that yields the same effects as the first aspect of the invention.

A 19th aspect of the invention is an integrated circuit that is used in a video signal display device for displaying a moving image that is made from a plurality of images, and includes an attraction point determination portion, a corrected center position storage portion, a corrected center position determination portion, a correction parameter creation portion, and a correction portion. The attraction point determination portion determines an attraction point in a current image that is one of the images that make up the moving image. The corrected center position storage portion holds coordinates of a corrected center point of a previous image that is an image previous to the current image. The corrected center position determination portion determines a corrected center point in the current image, based on the attraction point that is determined by the attraction point determination portion and the corrected center point of the previous image that is held in the corrected center position storage portion. The correction parameter creation portion creates a correction parameter based on the corrected center point of the current image. The correction portion corrects the current image based on the correction parameter. The corrected center position determination portion sets a point on the image that is between the attraction point and the corrected center point of the previous image, and whose distance on the image from the corrected center point of the previous image is equal to or less than a limit value, as the corrected center point of the current image. The corrected center position storage portion stores the coordinates of the corrected center point of the current image that has been determined by the corrected center position determination portion.

Thus, it is possible to achieve an integrated circuit that yields the same effects as the first aspect of the invention.

Advantageous Effects

With the invention, it is possible to achieve a video signal display device, a video signal display method, a program, and an integrated circuit, which can properly maintain correction information (such as the correction strength) while inhibiting unwanted effects that may occur in the processed imaged due to variation in correction between frames of a moving image and at the same time always performing appropriate correction. In other words, with this invention it is possible to achieve a video signal display device, a video signal display method, a program, and an integrated circuit that allow for less energy to be consumed while at the same time effectively inhibiting events that lead to the video feeling unnatural (such as flicker).

BRIEF DESCRIPTION OF DRAWINGS

FIG. 2(*b*) is a schematic view of a display screen that shows the attraction point and the corrected center point in the (N+1)-th frame. FIG. 2(*c*) is an explanatory diagram for explaining the corrected center point position limit by the limit value. FIG. 2(*d*) is a schematic view of a display screen that shows the attraction point and the corrected center point in the (N+2)-th frame. FIG. 2(*e*) is a schematic view of a display screen that shows the attraction point and the corrected center point in the (N+3)-th frame. FIG. 2(*f*) is an explanatory diagram that shows how the corrected center moves from the N-th frame through the (N+3)-th frame.

BEST MODE FOR CARRYING OUT THE INVENTION

Embodiments of the invention will now be explained below with reference to the drawings.

First Embodiment

<1.1: Configuration of the Video Signal Display Device>

Figure 1:
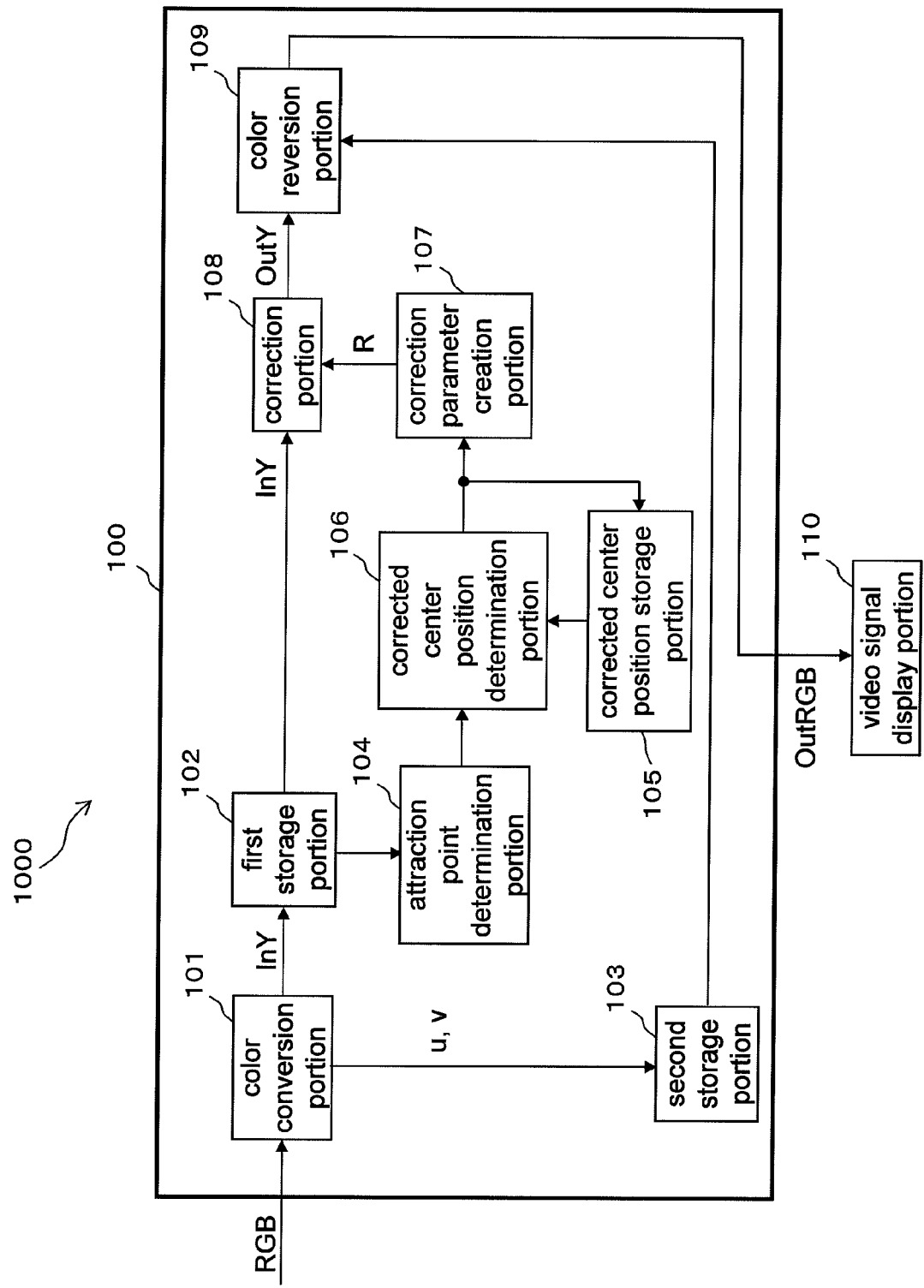
FIG. 1 is a block diagram that shows the configuration of a video signal display device 1000 according to the first embodiment of the invention.

FIG. 1 is a block diagram of a video signal display device 1000 according to the first embodiment of the invention.

The video signal display device 1000 of this embodiment is primarily made of a video signal processing portion 100 and a video signal display portion 110.

The video signal processing portion 100 is for performing video conversion of input video signals and then outputting an output video signal, and is provided with a color conversion portion 101 for converting the color space of an input video signal, a first storage portion 102 for storing the video signal for the brightness component that has been converted by the color conversion portion 101, and a second storage portion 103 for storing the video signals for components other than the brightness component that has been converted by the color conversion portion 101. The video signal processing portion 100 is also provided with an attraction point determination portion 104 that analyzes the video signal that is output from the first storage portion 102 to determine an attraction point, a corrected center position storage portion 105 for storing the coordinate information of the corrected center position of the previous frames, and a corrected center position determination portion 106 for determining the corrected center position based on the output from the corrected center position storage portion 105 and the attraction point determination portion. The video signal processing portion 100 also has a correction parameter creation portion 107 for creating a correction parameter based on the output from the correction center position determination portion, a correction portion 108 for correcting the video signal that is output from the first storage portion with the correction parameter that has been created by the correction parameter creation portion 107, and a color reversion portion 109 for obtaining an output video signal by reverting the color of the video signal that has been corrected by the correction portion 108 (video signal of the brightness component) and the video signals that are output from the second storage portion 103 (the video signals of components other than the brightness component).

The video signal display portion 110 displays the output video signal that is output from the video signal processing portion 100 on a display screen.

The various structural elements are described below.

The color conversion portion 101 converts the RGB color space of the input video signal into a Yuv color space. Specifically, it converts the R component video signal, the G component video signal, and the B component video signal of the input video signal into a video signal InY of the brightness component (Y component video signal), a video signal u (u component video signal) and a video signal v (v component video signal) of the components other than the brightness component. The color conversion portion then outputs the converted Y component video signal InY to the first storage portion 102, and outputs the u component video signal u and the v component video signal v to the second storage portion 103. It should be noted that the input video signal is not limited to a signal that is expressed by an RGB color space. There is of course no limitation to a Yuv color space as the color space for conversion by the color conversion portion 101. For the sake of convenience, hereinafter in the description the input video signal shall be a signal that is expressed by an RGB color space, and the input video signal shall be converted by the color conversion portion into a Yuv color space.

The first storage portion 102 stores one frame of the brightness component that is output from the color conversion portion 101 (that is, the Y component video signal InY), and outputs the stored Y component video signal InY to the correction portion 108 and the attraction point determination portion 104 at a predetermined timing. It should be noted that the first storage portion can be realized with a memory that can store a single frame of a video signal (such as a frame memory).

The second storage portion 103 stores a single frame of the components other than the brightness component that are output from the color conversion portion 101 (that is, the u component video signal u and the v component video signal v), and outputs the stored u component video signal and the v component video signal to the color reversion portion 109 at a predetermined timing. The second storage portion 103 outputs the u component video signal and the v component video signal at such a time that they are properly subjected to color reversion by the color reversion portion 109. As one example, p1(*x,y*) is a given pixel position on the image (video) that is formed by the video signal, OutY(x,y) is the Y component video signal that is output from the correction portion 108 that corresponds to the pixel position p1(*x,y*), Outu(x,y) and Outv (x,y) are the u component video signal and the v component video signal that correspond to the pixel position p1(*x,y*) and that are output from the second storage portion 103, respectively, and OutRGB(x,y) is the output video signal that is output from the color reversion portion 109 that corresponds to the pixel position p1(*x,y*). In this case, the second storage portion 103 adjusts the timing at which it outputs the u component video signal and the v component video signal such that the output video signal Out(x,y) is created through color reversion from OutY(x,y), Outu(x,y), and Outv(x,y).

The attraction point determination portion 104 receives and analyzes the Y component video signal that is output from the first storage portion 102, and determines the attraction point. It then outputs information on the position of the attraction point that it has chosen (for example, information that indicates the coordinates on a single image formed that is by the video signal) to the corrected center position determination portion 106.

Here, the attraction point is a point (or region) on the image that is formed by the (input) video signal that easily attracts a viewer's attention. In other words, the attraction point is a point (or region) on the display screen that easily attracts a viewer's attention when the image that is formed by the video signal is displayed on the display device. For example, if a video image that includes a face is displayed on the display screen of the display device, then the portion of the display screen that includes the face will be readily noticed by viewers. For this reason, the attraction point determination portion 104 looks for faces in the Y component video signal that it receives, and if it detects a face, then the center of the region that is detected (the image region that has been detected as a portion of a face in the image that is formed by the video signal) is taken as the attraction point. When the attraction point determination portion 104 cannot detect a face, it sets the approximate center of the display screen (the center point on the single image that is formed by the video signal), which in general is the focus of the viewer, as the attraction point.

The attraction point determination portion 104 does not necessarily have to detect/determine the attraction point using a face as the object to be detected, and it is also possible for telop characters or still objects on the screen (analyzed by movement vectors), for example, to serve as the object to be detected when determining the attraction point. In terms of a specific method for detecting the object to be detected, there is nothing to prevent the use of methods well-known to those in the art, and thus the method will not be described in detail.

The corrected center position storage portion 105 stores information on the coordinates of the corrected center position in the prior frame (information on the coordinates in a single image that is formed by the video signal). This is for storing information on the corrected center portion (such as information that indicates the corrected center position coordinates) that is output by the corrected center position determination portion 106, which is discussed later.

The corrected center position determination portion 106 receives the information on the position of the attraction point that has been determined by the attraction point determination portion 104, and the information on the corrected center position in the prior frame that is stored in the corrected center position storage portion 105, and determines the corrected center position for the current frame from the information on the position of the attraction point that was determined by the attraction point determination portion 104, and the information on the corrected center position in the prior frame that is stored in the corrected center position storage portion 105. The corrected center position determination portion 106 then outputs information pertaining to the corrected center position of the current frame that has been determined (such as information that indicates the corrected center position) to the corrected center position storage portion 105 and the correction parameter creation portion 107.

The correction parameter creation portion 107 receives the information relating to the corrected center position that has been determined by the corrected center position determination portion 106, and creates a correction parameter based on that information relating to the corrected center position that has been determined by the corrected center position determination portion 106. The correction parameter creation portion 107 then outputs the correction parameter that is created to the correction portion 108.

The correction portion 108 receives the correction parameter that has been set (created) by the correction parameter creation portion 107 and the Y component video signal InY that is output from the first storage portion 102, and corrects the Y component video signal InY that is output from the first storage portion 102 based on the correction parameter that has been set (created) by the correction parameter creation portion 107. The correction portion 108 then outputs the corrected video signal InY to the color reversion portion 109.

The color reversion portion 109 converts the output video signal OutY, which is in a Yuv color space, back to the RGB color space. In other words, the color reversion portion 109 receives the Y component video signal InY that is output from the correction portion 108 and the u component video signal u and the v component video signal v that are output from the second storage portion 103 and performs color space conversion (conversion from a Yuv color space to a RGB color space) on the Y component video signal InY that is output from the correction portion 108 and the u component video signal u and the v component video signal v that are output from the second storage portion 103. After obtaining an output video signal OutRGB, the color reversion portion 109 outputs the output video signal OutRGB that is obtained to the video signal display portion 110.

It should be noted that in this embodiment, the input video signal and the output video signal are both expressed by an RGB color space, whereas the processing in the video signal processing portion 100 is performed in a Yuv color space. However, it is also possible for the video signal of the brightness component that is used for processing in the video signal processing portion 100 to be a video signal of various other types of brightness components, such as the brightness component (Y) of a YCbCr color space. If conversion of the color space is not absolutely necessary, then it is also possible to omit the color conversion portion 101 or the color reversion portion 109. It should be noted that conversion methods for color space conversion that are used by the color conversion portion 101 and the color reversion portion 109 are well-known to those in the art and are not a limiting factor, and a detailed description thereof will not be made because color conversion/reversion is not an essential component of the invention.

The video signal display portion 110 receives the output video signal OutRGB that is output from the color reversion portion 109 and displays video that is formed by the output video signal OutRGB. The video signal display portion 110 has a self-illuminating display screen that emits its own light and allows light adjustment, and the amount of light can be adjusted for each position i (the position i on the image that is formed by the output video signal) in accordance with the output video signal. Representative examples of the video signal display portion 110 include a plasma display in which high pressure gas such as helium or neon is sandwiched between two glass plates and emits light when voltage is applied thereto, an organic EL that employs an organic substance that emits light when voltage is applied, a CRT (Cathode Ray Tube) that uses an electron gun, and a FED (Field Emission Display) in which electrons are emitted into a vacuum from a flat electron emission source (emitter) and generate light when they strike a fluorescent body.

<1.2: Operation of the Video Signal Display Device>

The operation of the video signal display device with the above configuration is described below.

The input video signal is converted by the color conversion portion 101 from an RGB color space video signal into a Y component video signal InY, a u component video signal u, and a v component video signal v, which are video signals in a Yuv color space. The Y component video signal InY that is obtained by conversion by the color conversion portion 101 is output to and stored in the first storage portion 102. On the other hand, the u component video signal u and the v component video signal v that are obtained by conversion by the color conversion portion 101 are output and stored in the second storage portion 103.

The Y component video signal InY that is stored in the first storage portion 102 is output to the attraction point determination portion 104.

The attraction point determination portion 104 determines the attraction point from the Y component video signal InY that is stored in the first memory 102 by analyzing the Y component video signal InY that is stored in the first memory 102. The attraction point determination portion 104 then outputs information on the position of the attraction point that has been determined (for example, information indicating coordinates on a single image that is formed by the video signal) to the corrected center position determination portion 106.

The attraction point determination portion 104 for example analyzes the Y component video signal InY and determines the attraction point as illustrated below.

(a1) The attraction point determination portion 104 detects sections of the image formed by the Y component video signal InY that include a person's face or a part of a person's face, and sets the center point of the detected region (for example, the center of the image region) as the attraction point.

(a2) The attraction point determination portion 104 detects sections of the image that is formed by the Y component video signal InY that contain characters, and sets the middle point of the detected region (for example, the center of the image region) as the attraction point.

(a3) If an attraction point cannot be determined in (a1) or (a2) above, then a specific position (such as the middle of the display screen) of the image that is formed by the Y component video signal InY (in other words, the display screen) is set as the attraction point.

In this way, the attraction point determination portion 104 determines the attraction point.

It should be noted that if the attraction point determination portion 104 detects more than one region that corresponds to (a1) and (a2), then it determines a single attraction point based on those detection results. The attraction point determination portion 104 determines the attraction point based on at least one of the size, the number, and the positional relationship of the detected image regions.

For example, the attraction point determination portion 104 may determine the attraction point as illustrated below.

(b1) The attraction point determination portion 104 chooses the attraction point based on the largest detected image region (for example, it sets the middle (center) of the largest image region as the attraction point).

(b2) If the number of detected image regions is equal to or greater than a predetermined value th, then the attraction point determination portion 104 chooses a predetermined position of the overall image region (such as the center of the image (which corresponds to the center of the display screen)) as the attraction point.

(b3) If a plurality of detected image regions are clustered at one location, then the attraction point determination portion 104 chooses the center of the image region that is formed by the plurality of image regions as the attraction point.

(b4) If a plurality of detected image regions are not clustered at one location, then the attraction point determination portion 104 chooses a predetermined position of the overall image region (such as the center of the image (which corresponds to the center of the display screen)) as the attraction point.

Figure 3:
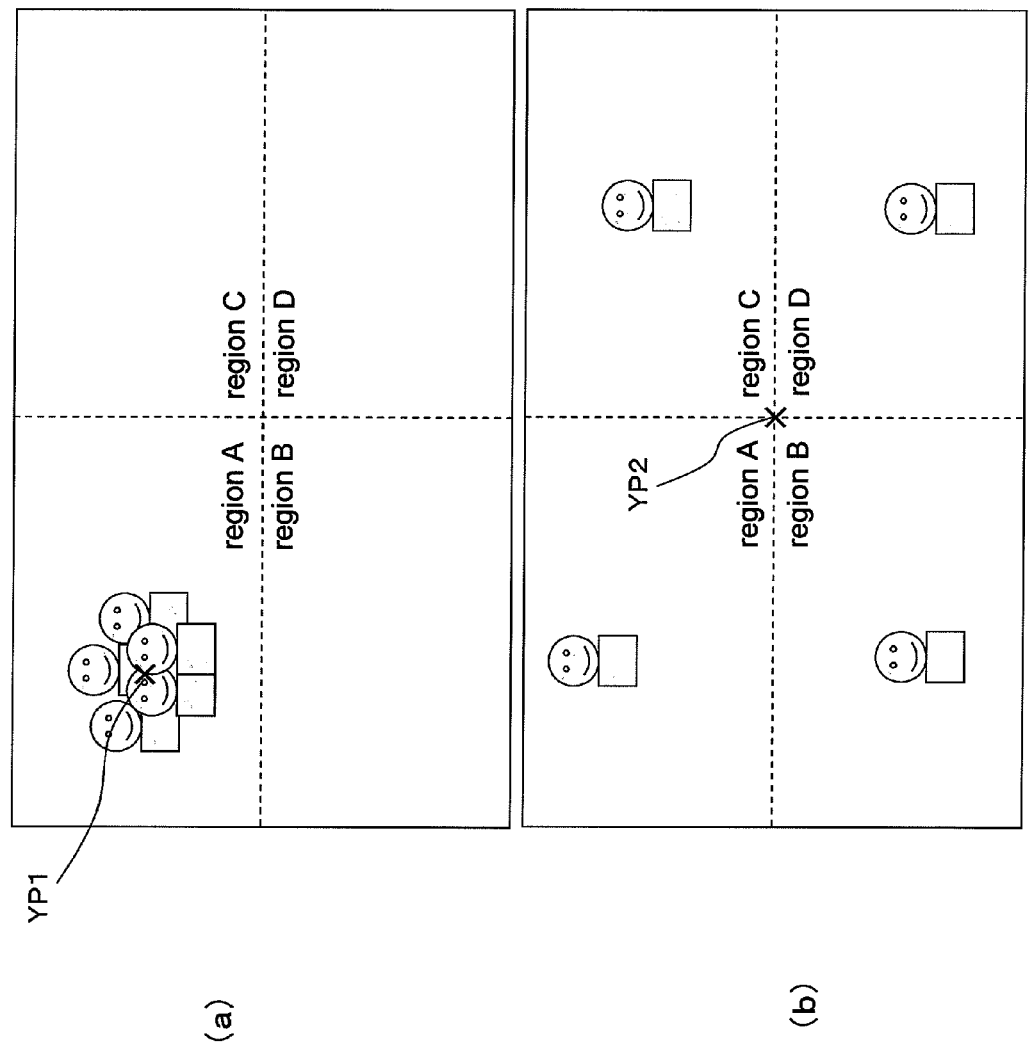
FIG. 3 is a schematic view that shows a display screen that is formed by the Y component video signal InY.

It should be noted that whether or not a plurality of detected image regions are clustered at one location in (b3) and (b4) above is determined as follows. FIG. 3 is used in the following explanation.

FIGS. 3(*a*) and 3(*b*) are schematic views that show display screens that have been formed by the Y component video signal InY.

The attraction point determination portion 104 separates the display screen that is shown in FIG. 3 (the image that is formed by the Y component video signal InY) into regions A through D as illustrated in FIG. 3, and regions that were described above in (a1) and (a2) are detected in each individual region. Here, image regions with faces of people are being detected.

In FIG. 3(*a*), an image region with five faces is detected in region A, whereas in regions B through D the number of detected image regions as described in (a1) and (a2) above is zero. Therefore, in this case, the attraction point determination portion 104 determines that a plurality of detected image regions are clustered in region A. The attraction point determination portion 104 then chooses the center point YP1 of the image region that forms the five faces in region A as the attraction point.

It should be noted that here the attraction point determination portion 104 determines that a plurality of detected image regions are clustered if the number of detected regions is equal or greater than a predetermined number th (=2) in the four divided regions, but of course it is not necessary for th=2.

In FIG. 3(*b*) there is one detected image region in each of the regions A through D (the number of detected image regions is not equal to or greater than the predetermined number th (=2) in any of the regions), and thus the attraction point determination portion 104 determines that the plurality of image regions that have been detected are not clustered at one position. In this case, the attraction point determination portion 104 then chooses the center point YP2 of the display screen, which is the predetermined position for the entire image region (and corresponds to a single display screen in FIG. 3) as the attraction point as described above in (b4). It should be noted that the attraction point in this case of course does not have to be the exact center of the display screen, and can also be a point that is near the center of the display screen.

The above description was made with regard to a case in which the screen is divided into quarters, but there is no limitation regarding the number into which the screen is divided, and other numbers of divisions are possible as well.

The information on the position of the attraction point that has been determined as described above is output to the corrected center position determination portion 106.

The corrected center position determination portion 106 determines the corrected center position of the current frame from the information on the position of the attraction point that was determined by the attraction point determination portion 104, and the information on the corrected center position of the previous frame that is stored in the corrected center position storage portion 105.

This is described in detail below.

Figure 2:
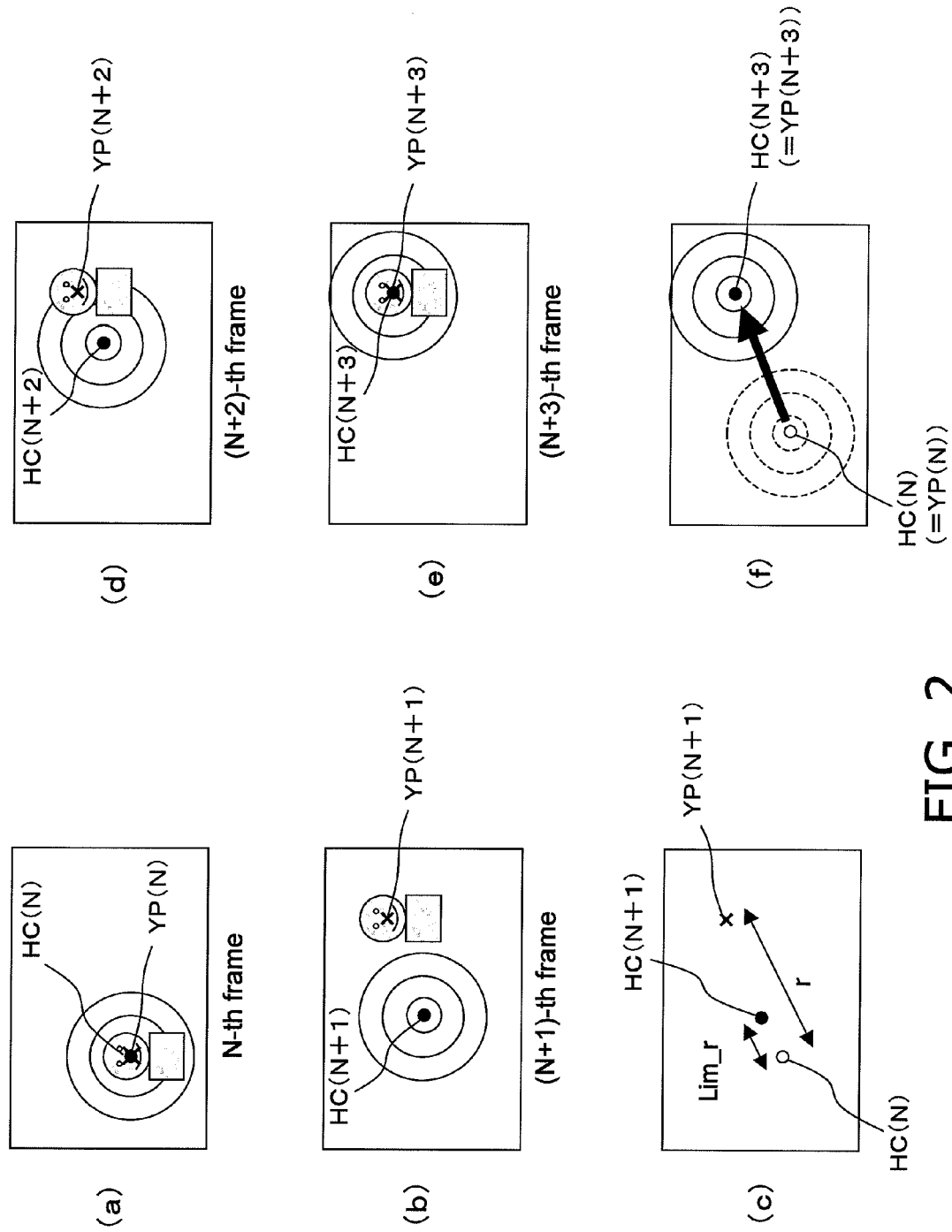
FIG. 2(*a*) is a schematic view of a display screen that shows the attraction point and the corrected center point in the N-th frame.

This embodiment illustrates a detailed description, using FIG. 2, of a case in which the corrected center position of the current frame is chosen such that the corrected center position of the current frame is between the corrected center point of the previous frame and the attraction point of the current frame, and the distance between the corrected center position of the current frame and the coordinates of the corrected center point of the previous frame is equal to or less than a limit value.

FIG. 2 is a schematic view of the display screen in a case where video that is formed by the video signal is displayed on the display device.

FIG. 2(a) is a diagram that shows correction centered around a face, and the black dot in FIG. 2(a) indicates the corrected center HC and the point marked with the X in FIG. 2(a) indicates the attraction point YP. FIG. 2(a) shows a state in which correction is performed in concentric circles about the corrected center HC (indicating that the degree of correction (correction strength) is equal at points on the concentric circles of FIG. 2(a)). It should be noted that the concentric circles in FIG. 2(a) are not actually displayed on the actual display screen, and are illustrated here only for the sake of the description (the same applies for FIGS. 2(b), (d), (e), and (f)).

FIG. 2(b) is a diagram of a case in which the location of the face has changed from the frame of FIG. 2(a) (hereinafter, the frame of FIG. 2(a) shall be referred to as the "N-th frame") to the next frame (hereinafter, this frame shall be referred to as the "(N+1)-th frame"). For the sake of the description, hereinafter the position of the corrected center HC of the N-th frame will be labeled "HC(N)" and the position of the attraction point YP of the N-th frame will be labeled "YP(N)".

In FIG. 2(b), the position of the attraction point YP is the position of the face, but the position of the corrected center HC is adjusted based on the limit value.

In other words, when r is the distance between the corrected center HC(N) of the N-th frame (FIG. 2(a)), which is the frame one frame prior, and the attraction point YP(N+1) of the (N+1)-th frame (FIG. 2(b)), which is the current frame, and Lim_r is the limit value, then the corrected center position determination portion 106:

(1) if r≦Lim_r, chooses the corrected center HC(N+1) of the current frame as the position of the attraction point YP(N+1); or (2) if r>Lim_r, sets the corrected center HC(N+1) of the current frame to a position that is between the corrected center HC(N) of the previous frame and the attraction point YP(N+1) of the current frame, and that is away from the corrected center HC(N) of the previous frame by the amount of Lim_r.

Continuing the description using FIG. 2(c), the point indicated by the empty white circle is the corrected center HC(N) of the previous frame (corrected center of FIG. 2(a)), and the point indicated by the X mark shows the attraction point YP(N+1) of the current frame (attraction point of FIG. 2(b)). In the case of r>Lim_r, the corrected center position determination portion 106 sets the corrected center position HC(N+1) of the current frame (the point indicated by the black circle) to a position that is away from the corrected center HC(N) of the previous frame (the point indicated by the empty white circle) by the amount of Lim_r.

FIG. 2(d) is a diagram that shows the corrected center position HC in the frame that follows FIG. 2(b) (the (N+2)-th frame), and FIG. 2(e) shows the corrected center position HC of the subsequent frame (the (N+3)-th frame). Here, the corrected center position HC reaches the attraction point YP (see FIG. 2(f)) over the four frames depicted in FIGS. 2(a), (b), (d), and (e).

A large limit value increases the distance from the corrected center of the previous frame to the corrected center of the current frame, whereas a small limit value decreases this distance. In other words, if one watches the corrected center position move to the attraction point over the display screen, it could be said that it moves faster the larger the limit value, and moves slower the smaller the limit value.

From experiment we found that on a 42-inch plasma display with a resolution of 1024 horizontal pixels×768 vertical pixels, movement of the corrected center does not stand out if the corrected center moves at a speed of 4 pixels or less per frame in a 60 fps (frame per second) video (in other words, the visual properties of human vision do not allow movement of the corrected center to be recognized, and thus we found that it was rare for viewers of the display screen to feel that the video was unnatural). Accordingly, in this embodiment the limit value is a fixed value of four pixels. It should be noted that while this value is preferable, it is of course also possible to achieve the effects of the invention with another value as well.

It should be noted that it is also possible for the limit value to be input by the user making a selection on a menu screen or the like, or for it to be switched based on the genre of the input video (movie, sports, news, etc.).

Further, in this embodiment, the limit value is given for the linear distance between the corrected center position of the previous frame and the corrected center position of the current frame, but it is also possible to given a limit value split between the horizontal and vertical directions.

In this way, the coordinate information for the corrected center position that has been determined by the corrected center position determination portion 106 is output to the corrected center position storage portion 105 and the correction parameter creation portion 107.

The corrected center position storage portion 105 stores the coordinate information of the corrected center position of the current frame that has been determined by the corrected center position determination portion 106, and during processing of the next frame outputs the coordinate information of the corrected center position of the current frame to the corrected center position determination portion 106 as the coordinate information of the corrected center position of the previous frame.

It should be noted that while the current embodiment describes a case in which the coordinate information is stored for a single frame, it is also possible to store the information for a plurality of frames. In this case, information on the movement history of the center position that spans over several past frames is obtained and thus it becomes possible for the corrected center position determination portion 106 to control the corrected center position in accord with that movement record.

The correction parameter creation portion 107 creates a correction parameter from the information on the coordinates of the corrected center position of the current frame that has been determined by the corrected center position determination portion 106. In other words, the correction parameter creation portion 107 creates a correction gradient gain that serves as a correction parameter for correcting to a signal that lowers the luminance of the display screen toward the periphery from the corrected center position HC, based on the distance between a given point p within the display screen and the corrected center position HC.

The "correction gradient gain" here indicates the degree to which the signal values of the pixels in the image (video) that is formed by the video signal (that is, the pixel values of the pixels) are lowered. The value that is obtained by multiplying the input signal value and this correction gradient gain is the value for lowering the signal value of that pixel.

Figure 4:
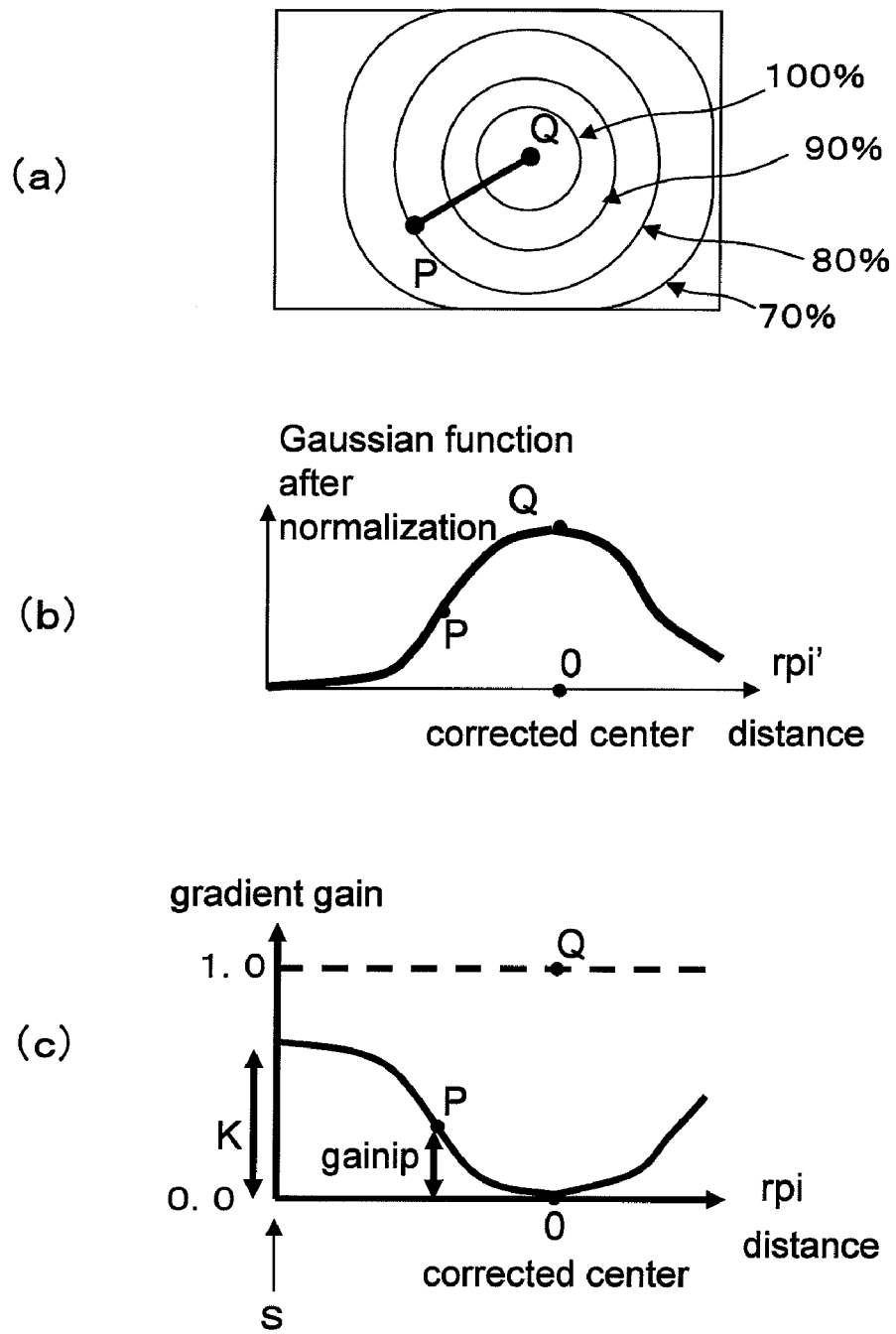
FIG. 4 is a diagram for describing the correction gradient gain.

This is described in greater detail using FIG. 4.

FIG. 4(*a*) represents the display screen of the video signal display device 1000 in which contour lines are formed by joining, with a line, pixels to which the same corrected gradient gain value has been applied. The values of the contour lines (the values shown by the arrows in FIG. 4(*a*)) indicate the degree of drop in the signal value due to the corrected gradient gain (=output signal value/input signal value). In other words, FIG. 4(*a*) is a space shape diagram that illustrates how the luminance drops from the corrected center Q toward the periphery of the display screen, when the point Q serves as the corrected center. It should be noted that in FIG. 4, a Gaussian function is used to smoothly change the corrected gradient gain from the corrected center Q.

FIG. 4(*b*) shows the relationship between the normalized distance and the value of the Gaussian function after normalization. In FIG. 4(*b*) the horizontal axis is the normalized distance and the vertical axis is the normalized Gaussian function value. The correction gradient gain for the pixels is determined based on this waveform.

It should be noted that the normalized distance is the distance that is normalized with the distance between the screen center and the screen corners, and is expressed by:

$$rpq' = \frac{rpq}{r\_max} \quad [\text{Eq. 1}]$$

If rpq is greater than r_max, then rpq is saturated by r_max.

The distance rpq is a scalar quantity that is found from a given pixel p and the coordinates of the corrected center Q (xq,yq) on the display screen, and here is a simple distance that is expressed by Equation 2, but there is no limitation to this and for example it is also possible for it to be a distance in an elliptical space or a rectangular space as set forth in Patent Citation 2.

$$rpq = \sqrt{(xp-xq)^2 + (yp-yq)^2} \quad [\text{Eq. 2}]$$

Here, (xp,yp) are the coordinates of a given pixel p and (xq,yq) are the coordinates of the corrected center Q.

The normalized Gaussian function is:

$$gauss\_n(rpq') = \frac{gauss(rpq') - gauss(1)}{gauss(0) - gauss(1)} \quad [\text{Eq. 3}]$$

It should be noted that gauss represents a Gaussian function, and is:

$$gauss(rpg) = \frac{1}{\sqrt{2\pi}\sigma} \exp\left(-\frac{rpq^2}{2\sigma^2}\right) \quad [\text{Eq. 4}]$$

Here, exp is an exponent, and σ is a constant (=0.35) that defines the waveform shape of the Gaussian function.

FIG. 4(*c*) shows the relationship between the distance rpq and the correction gradient gain. On the horizontal axis in FIG. 4(*c*), the corrected center Q is the origin.

The correction gradient gain gainp for a given pixel p is a scalar quantity that is found from the distance, and here the correction gradient gain is calculated using Equation 5 which uses a Gaussian function for gradually changing the correction gradient gain so that people do not readily notice the drop in luminance.

$$gainp = K \times \left\{1 - \frac{gauss(rpq') - gauss(1)}{gauss(0) - gauss(1)}\right\} \quad [\text{Eq. 5}]$$

Here, K is a constant (real number) from 0 to 1, and is the maximum signal drop rate (=maximum signal drop amount/maximum signal value). Here, the maximum signal value is the maximum value that can be taken on by the signal, and if the data are 8-bit data then it corresponds to 255. The maximum signal drop is the maximum value of the drop from the maximum signal value due to the correction (the amount of the drop in the signal value). For example, the amount of the drop in the signal at point S (the point with the greatest distance from the corrected center Q) in FIG. 4(*c*) corresponds to this (at the point with the greatest distance from the corrected center Q, there is a drop in the maximum signal value (the signal value is a minimum value)).

It should be noted that setting the maximum signal drop rate K is equivalent to setting the overall correction strength. Here, the "overall correction strength" is a value that expresses an approximation of the amount of correction of the screen overall. Setting a large K increases the maximum signal drop amount and increases the amount of correction of the screen overall (there is a larger drop in light emission in the screen overall). Setting a small K reduces the maximum signal drop and reduces the amount of correction of the screen overall (there is a smaller drop in light emission in the screen overall).

It should be noted that it is also possible to change the maximum signal drop rate K in accordance with the input signal. For example, as with the technology that is disclosed in Japanese Patent Application No. 2007-012214, it is desirable to adjust the maximum signal drop rate K in such a manner that the drop in the amount of emitted light goes undetected.

The above allows a gradient gain gainp to be created for a given point p. In the same fashion, a gradient gain is created for all points (all points that correspond to pixels).

The correction parameter that is created by the correction parameter creation portion 107 in this manner are output to the correction portion 108.

The Y component video signal InY that is output from the first memory portion 102 is corrected by the correction portion 108 based on the correction parameter that is created by the correction parameter creation portion 107.

For example, the amount of the drop from the input signal level is found by multiplying the correction parameter and the signal level (input signal level) of the Y component video signal InY that is input to the correction portion 108, and this drop amount is subtracted from the input video signal InY to obtain the signal level of the output video signal OutY. In other words, the corrected Y component video signal OutY is obtained by the correction portion 108 executing the processing that is expressed by Equation 6.

$$OutY\_p = InY\_p - (InY\_p \times gainp) \quad [\text{Eq. 6}]$$

It should be noted that here, the input signal and the output signal for a pixel p of the image (video) that is formed by the video signal are expressed as InY_p and OutY_p, respectively.

Thus, an output signal value is obtained for a given point (pixel) P. By obtaining output signal values for all points (pixels) in the same manner, it is possible to obtain (correct) the video signal for a single frame.

The Y component video signal OutY that has been corrected by the correction portion 108 is this manner is output to the color reversion portion 109.

The color reversion portion 109 performs color space conversion on the corrected Y component video signal OutY and the u component video signal u and the v component video signal v that are output from the second storage portion 103 (it converts the color space from a Yuv color space to an RGB color space), converting the signals to an output video signal OutRGB. The output video signal OutRGB that is obtained through this processing by the color reversion portion 109 is output to the video signal display portion 110.

The output video signal OutRGB that is output from the color reversion portion 109 is displayed as video by the video signal display portion 110.

In this way, the video signal display device 1000 allows the regions of the input video signal that are readily noticed by viewers to continue to feel bright while reducing the power that is consumed. It is also possible to maintain this effect without significantly changing the amount of correction of the screen overall (here, the amount of signal drop in the screen overall) even in instances in which there is a large change in the location of a region that is readily noticed by viewers. The video signal display device 1000 also determines the corrected center of the current frame in consideration of the relationship between the attraction point and the corrected center of the previous frame and thus can suppress sudden changes in the moving image due to correction variation between frames. As a result, the video signal display device 1000 allows appropriate correction to be performed even for a moving image in which there is a sudden change between frames, and the device can always obtain an appropriate moving image.

Second Embodiment

A second embodiment of the invention is described next.

Figure 5:
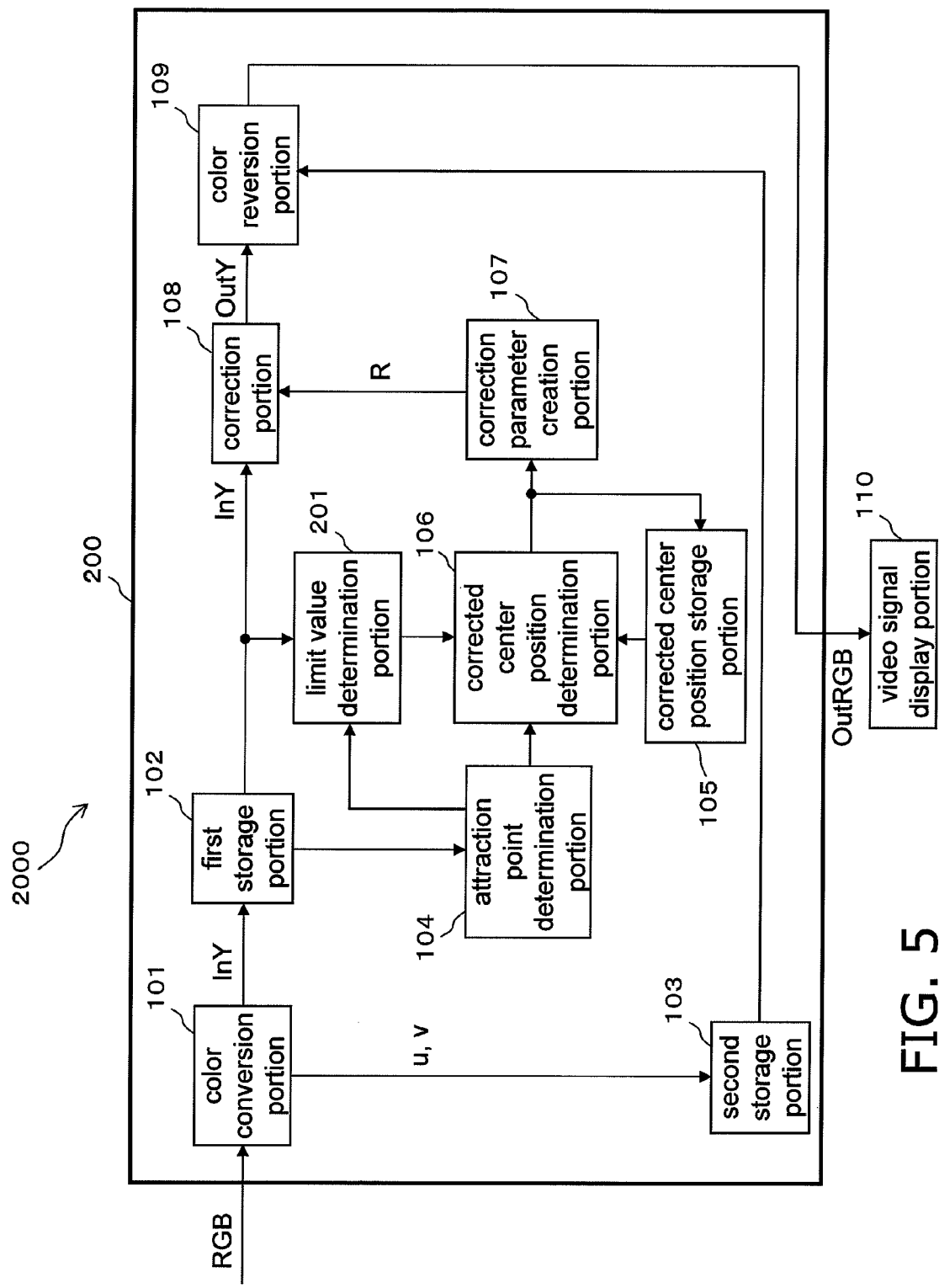
FIG. 5 is a block diagram that shows the configuration of the video signal display device 2000 according to the second embodiment of the invention.

FIG. 5 is a block diagram of a video signal display device 2000 according to the second embodiment of the invention.

FIG. 5 uses the same reference numbers for structural elements that are the same as those of the video signal display device 1000 according to the first embodiment, and these will not be described.

As illustrated by FIG. 5, the video signal display device 2000 according to this embodiment differs from the video signal display device 1000 of the first embodiment in that in addition to having the same configuration as the video signal display device 1000 of the first embodiment it also includes a limit value determination portion 201. In other words, the video signal display device 2000 differs from the video signal display device 1000 in that the limit value is a variable (a changeable value) rather than a fixed value.

The limit value determination portion 201 receives the Y component video signal InY that is output from the first memory portion 102, and determines the limit value from the Y component video signal InY and outputs the limit value that has been determined to the corrected center position determination portion 106.

The limit value determination portion 201 determines the limit value according to the Y component video signal InY that it receives. In other words, the limit value determination portion 201 assesses for scene changes from the Y component video signal InY that is input to the limit value determination portion 201 and significantly changes the limit value when it is determined that there is a scene change. Here a scene change is a frame in which the setting has shifted. Since there can be a large change in the video at scene changes (that is, because there is a large difference between the video (image) of the current frame and the video (image) of the frame one frame prior), non-uniformities in the correction do not stand out.

The corrected center therefore can be instantly moved to an attraction point when a scene change occurs because correction variability does not stand out.

The method by which the limit value determination portion 201 determines the limit value can be modified as follows.

(Modification 1)

The limit value determination portion 201 was described above with regard to a case in which it determines the limit value according to scene change information, but it is also possible for it to determine the limit value according to a value (power) C that is obtained by squaring the value that is calculated by converting the input video signal into frequency space and then extracting the component in which the space frequency component is within a specified band and performing the calculation of Equation 7. More specifically, an FFT filter is applied to the input video signal and the square of that 0 to 1 cpd (cycle per degree) component is found and the limit value is determined according to that value.

$$C = \int_{0cpd}^{1cpd} |F(\omega)|^2 d\omega \quad [\text{Eq. 7}]$$

It should be noted that the cpd (cycle per degree) is the viewing angle, and for example, if the display screen has a horizontal pixel number of 1024 and the viewing angle is 33-degrees, then the maximum value of the space frequency is approximately 15.5 cpd. $F(\omega)$ is the result that is obtained by Fourier transformation of the input video signal InY. It should be noted that while here Fourier transformation is described, it is also possible to use other transformation methods such as discrete cosine transformation or wavelet transformation.

Further, in Equation 7 although it is preferable for the integration range to be from 0 cpd to 1 cpd, it should be obvious that the integration range of Equation 7 is not limited to this.

FIG. 6(a) is a graph in which the horizontal axis is the power C and the vertical axis is the limit value, and shows an example of the characteristics of (power C)–(limit value). As illustrated in FIG. 6(a), correction becomes less noticeable the larger the power C and thus the limit value is increased, whereas correction becomes more noticeable the smaller the power and thus the limit value is decreased.

Figure 6:
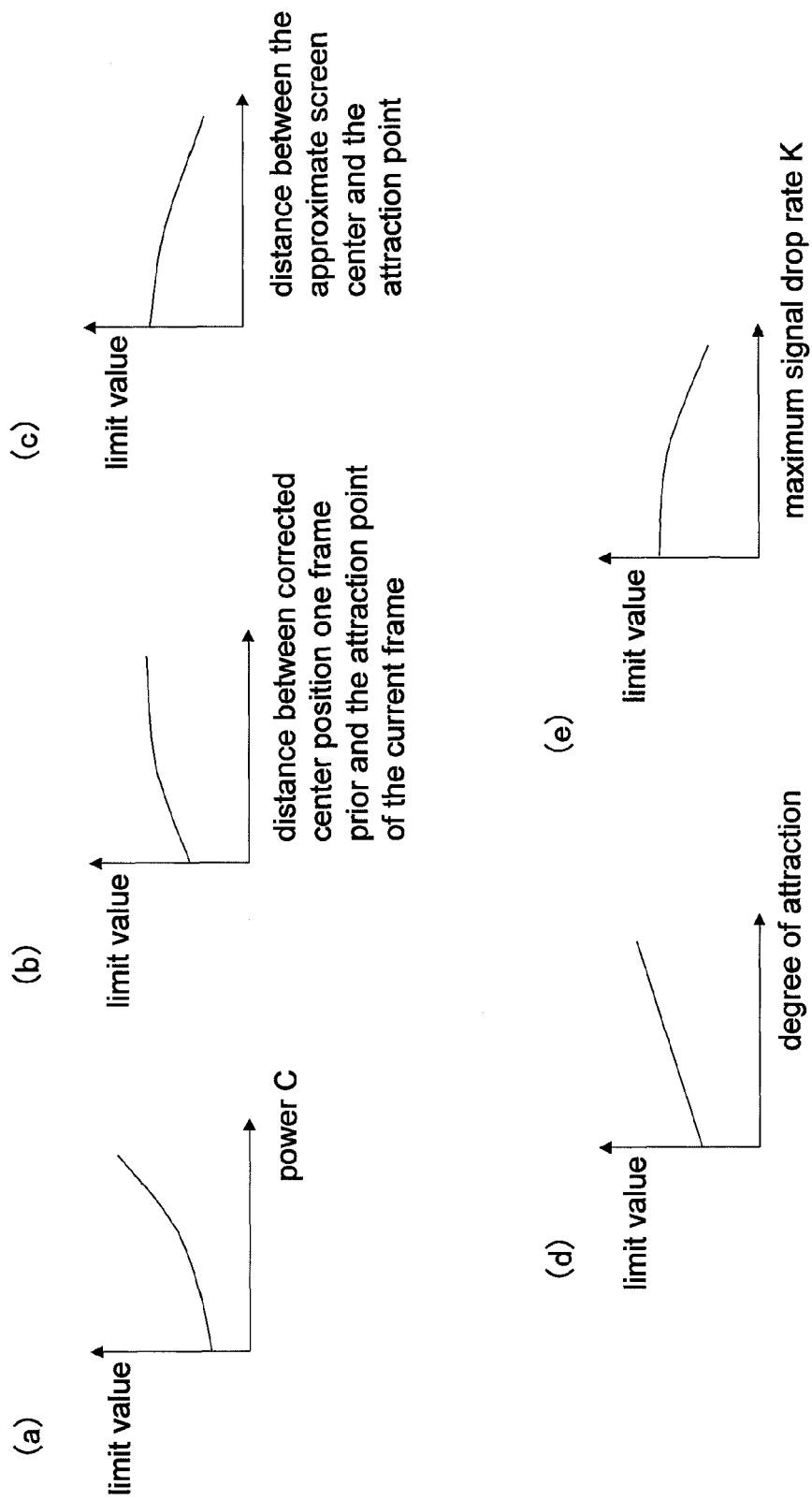
FIG. 6 is an explanatory diagram that shows an example of control of the limit value.

In other words, the limit value determination portion 201 determines the limit value based on the characteristics displayed in FIG. 6(*a*).

By the video signal display device 2000 determining the limit value in this way, the movement speed of the corrected center can be adjusted according to the likelihood that the correction will be noticed.

(Modification 2)

The limit value determination portion 201 can also determine the limit value according to the distance to the attraction point. In other words, it is also possible for the limit value determination portion 201 to determine the limit value based on the distance between the corrected center position of the previous frame and the attraction point of the current frame.

FIG. 6(*b*) is a graph in which the horizontal axis is the distance and the vertical axis is the limit value, and shows an example of the characteristics of (distance between the corrected center position of the previous frame and the attraction point of the current frame)–(limit value). As can be understood from the characteristics of FIG. 6(*b*), the limit value increases the longer the distance and decreases the shorter the distance.

By the video signal display device 2000 determining the limit value in this way, it is possible to give acceleration (negative acceleration) to the movement of the corrected center (in other words, it is possible to slow the movement speed of the corrected center as it approaches the attraction point), and allows for rapid tracking even if there has been significant movement in the position to be corrected on the screen.

(Modification 3)

The limit value determination portion 201 can also determine the limit value according to the attraction point's position on the screen. In other words, it is also possible for the limit value determination portion 201 to determine the limit value based on the distance between the approximate screen center and the attraction point.

FIG. 6(*c*) is a graph in which the horizontal axis is the distance and the vertical axis is the limit value, and shows an example of the characteristics of (distance between the approximate screen center and the attraction point)–(limit value). As can be understood from the characteristics of FIG. 6(*c*), the limit value decreases the longer the distance and increases the shorter the distance. This is based on the fact that generally people focus on the position on the screen that is the approximate screen center.

By the video signal display device 2000 determining the limit value in this way, it is possible to change the movement speed depending on whether movement is toward the approximate screen center or away from the approximate screen center, and the approximate screen center can be preferentially chosen as the corrected center at times when there is a low detection rate to the process for face detection, for example.

(Modification 4)

It is also possible for the limit value determination portion 201 to determine the limit value according to the degree of attraction. Here, the degree of attraction is the extent to which an object to be detected draws a viewer's attention. In this embodiment, the attraction point determination portion 104 determines the attraction point by performing a detection for image regions such as faces, and at this time it determines the degree of attraction according to the size of the image region such as s face that is detected. The larger the detected image region such as a face, the larger the value of the degree of attraction. The limit value determination portion 201 then determines the limit value according to this degree of attraction. The degree of attraction is preferably a real number from 0 to 1.

It should be noted that there is no limitation to the degree of attraction being determined in accordance with the size of the face. For example, it is also possible for the degree of attraction to be determined using the screen position (objects are less likely to be noticed the farther they are from the center) or the detection accuracy (objects for which detection is uncertain are less likely to be noticed), for example.

For example, if the border of a detected image region resembles a human face, and that color is not skin color, then there is a possibility that the detected image region may happen to be another object that has a shape that resembles a human face and thus the degree of attraction is set low (for example, the degree of attraction may be set to 0.5 (where the degree of attraction takes on real values from 0 to 1)).

On the other hand, if the border of a detected image region resembles a human face, and that color is skin color, then there is a high likelihood that the detected image region is an image region that forms a human face and thus the degree of attraction is set high (for example, the degree of attraction may be set to 0.9 (where the degree of attraction takes on real values from 0 to 1)).

FIG. 6(*d*) is a graph in which the horizontal axis is the degree of attraction and the vertical axis is the limit value, and shows an example of the characteristics of (degree of attraction)–(limit value). As can be understood from the characteristics of FIG. 6(*d*), the limit value increases the greater the degree of attraction and decreases the less the degree of attraction.

By the video signal display device 2000 determining the limit value in this way, it is possible to more rapidly move the corrected center position to a region that readily draws attention.

It should be noted that, as shown in FIG. 5, it is preferable that the degree of attraction is calculated by the attraction point determination portion 104 and that the degree of attraction that has been calculated is output to the limit value determination portion 201. It should be noted that it is also possible for the degree of attraction to be calculated by the limit value determination portion 201.

(Modification 5)

It is also possible for the limit value determination portion 201 to determine the limit value according to the overall correction strength. In other words, the limit value determination portion 201 can also determine the limit value based on the maximum value of the correction gradient gain (maximum signal drop rate K) that is created by the correction parameter creation portion 107.

This is based on the observation that movement of the corrected center is readily noticed when the gradient is large (there is a large drop in the signal) and movement of the corrected center is difficult to notice when the gradient is small (there is a small drop in the signal).

FIG. 6(*e*) is a graph in which the horizontal axis is the maximum signal drop rate K and the vertical axis is the limit value, and shows an example of the characteristics of (maximum signal drop rate)–(limit value). As can be understood from the characteristics of FIG. 6(*e*), the limit value decreases the larger the maximum signal drop rate and increases the smaller the maximum signal drop rate.

By the video signal display device 2000 determining the limit value in this way, it is possible to suppress movement of the corrected center when there is a large gradient (when there is a large drop in the signal), at which time movement of the corrected center is readily noticed.

It should be noted that the Modifications 1 through 5 can each be adopted independently or in combination.

Other Embodiments

In the foregoing embodiments, the video signal display device was described with regard to the execution of processing in frames, but it is also possible for the video signal display device to execute processing in fields.

In the video signal display device that was described in the foregoing embodiments, the blocks can be independently processed into single chips, or into single chips that include some or all of the blocks, by a semiconductor device such as an LSI.

It should be noted that here this is an LSI, but depending on differences in the degree of integration, it may be referred to as an IC, system LSI, super LSI, or ultra LSI.

The method of circuit integration is not limited to LSI, and this can also be achieved with a dedicated circuit or a generalized processor. After fabrication of the LSI, it is possible to use a programmable FPGA (Field Programmable Gate Array) or a reconfigurable processor in which the connections and settings of the circuit cells within the LSI can be reconfigured.

Further, if other technologies that improve upon or are derived from semiconductor technologies lead to integration technology that supplants LSI, then of course it is also possible to integrate the functional blocks using that technology. Biotechnology applications are one possibility.

The various processes of the foregoing embodiment can be achieved by hardware or software. They also can be achieved by a processing mixture of hardware and software. It should be noted that if the video signal display device according to the foregoing embodiments is to be achieved by hardware, then it is of course necessary to perform timing correction for carrying out the various processes. For the sake of simplifying the description, the above embodiments did not include a detailed discussion of the timing adjustment for the various signals that occurs in the actual hardware design.

It should be noted that the specific configuration of the invention is not limited to the embodiments discussed above, and various modifications and revisions are possible within a scope that does not deviate from the gist of the invention.

INDUSTRIAL APPLICABILITY

The video signal display device, the video signal display method, the program, and the integrated circuit according to the invention allow for sufficient feeling of brightness to be obtained in regions that viewers readily notice, and allow power consumption to be kept down, and thus are useful in industrial fields related to video machines and can be implemented in those fields.

EXPLANATION OF REFERENCE

| | |
|---|---|
| 1000, 2000 | video signal display device |
| 100, 200 | video signal processing portion |
| 101 | color conversion portion |
| 102 | first storage portion |
| 103 | second storage portion |
| 104 | attraction point determination portion |
| 105 | corrected center position storage portion |
| 106 | corrected center position determination portion |
| 107 | correction parameter creation portion |
| 108 | correction portion |

-continued

EXPLANATION OF REFERENCE

| | |
|---|---|
| 109 | color reversion portion |
| 110 | video signal display portion |
| 201 | limit value determination portion |

The invention claimed is:

1. A video signal display device for displaying a moving image that is made from a plurality of images, comprising:
an attraction point determination portion operable to determine an attraction point in a current image, which is one of the images that make up the moving image;
a corrected center position storage portion operable to hold coordinates of a corrected center point of a previous image, which is the image that is previous to the current image;
a corrected center position determination portion operable to determine a corrected center point in the current image, based on the attraction point that is determined by the attraction point determination portion and the corrected center point of the previous image that is held in the corrected center position storage portion;
a correction parameter creation portion operable to create a correction parameter based on the corrected center point of the current image;
a correction portion operable to correct the current image based on the correction parameter; and
a display portion operable to display the image that is obtained by correction by the correction portion;
wherein the corrected center position determination portion sets a point on the image that is between the attraction point and the corrected center point of the previous image, and whose distance on the image from the corrected center point of the previous image is equal to or less than a limit value, as the corrected center point of the current image; and
wherein the corrected center position storage portion stores the coordinates of the corrected center point of the current image that has been determined by the corrected center position determination portion.

2. The video signal display device according to claim 1, wherein the attraction point determination portion detects a predetermined image region to be detected from the current image and determines the attraction point based on the image region to be detected that has been detected.

3. The video signal display device according to claim 2, wherein the image region to be detected is an image region that includes faces or portions of faces.

4. The video signal display device according to claim 2, wherein the image region to be detected is an image region that includes characters.

5. The video signal display device according to claim 2, wherein in a case where the attraction point determination portion has detected a plurality of image regions to be detected, the attraction point determination portion determines that the attraction point is a single point on the image based on the plurality of image regions to be detected that have been detected.

6. The video signal display device according to claim 5, wherein in a case where the attraction point determination portion has detected a plurality of image regions to be detected, the attraction point determination portion determines that the attraction point is a single point on the image based on at least one of size, number, and positional relationship, of the plurality of image regions to be detected that have been detected.

7. The video signal display device according to claim 1, wherein in a case where the attraction point determination portion does not detect an image region to be detected, the attraction point determination portion chooses as the attraction point a point on the image that corresponds to a specific position on the display screen that is formed by the image.

8. The video signal display device according to claim 7, wherein the attraction point determination portion sets the point on the image that corresponds to approximately center of the display screen that is formed by the image as an initial position of the attraction point.

9. The video signal display device according to claim 1, wherein in a case where the moving image is video with 60 fps (frames per second), the corrected center position determination portion sets the limit value to a fixed value that is 1 or more pixels but not more than 4 pixels.

10. The video signal display device according to claim 1, further comprising:
a limit value determination portion operable to change the limit value based on the current image.

11. The video signal display device according to claim 10, wherein the limit value determination portion changes the limit value based on scene change information.

12. The video signal display device according to claim 10, wherein the limit value determination portion changes the limit value according to a distance on the image between the attraction point of the current image and the corrected center point of the previous image.

13. The video signal display device according to claim 10, wherein the limit value determination portion changes the limit value according to a position of the attraction point on the display screen that is formed by the image.

14. The video signal display device according to claim 10, wherein the limit value determination portion increases the limit value the larger a degree of attraction, which is a measure that expresses a degree by which a viewer's attention is captured, is on the display screen that is formed by the image.

15. The video signal display device according to claim 14, wherein the attraction point determination portion detects a predetermined image region to be detected from the current image, and calculates the degree of attraction based on at least one of size, number, position on the image, and detection reliability, of the image region to be detected that has been detected; and
wherein the limit value determination portion changes the limit value based on the attraction degree that has been calculated by the attraction point determination portion.

16. The video signal display device according to claim 1, wherein the corrected center position determination portion changes the limit value according to a correction strength that is used by the correction parameter creation portion for creating the correction parameter.

17. A video signal display method of displaying a moving image that is made from a plurality of images, comprising:
determining an attraction point in a current image, which is a single image that makes up the moving image;
obtaining coordinates of a corrected center point of a previous image, which is an image prior to the current image;
determining a corrected center point in the current image, by setting a point on the image that is between the attraction point and the corrected center point of the previous image, and whose distance on the image from the corrected center point of the previous image is less than or equal to a limit value, as the corrected center point of the current image;
creating a correction parameter based on the corrected center point of the current image;
correcting the current image based on the correction parameter; and
displaying the image that is obtained by correction in the correction step.

18. A storage medium storing a program executable on a computer that displays video signals and that displays a moving image that is made from a plurality of images,
wherein the program causes the computer to execute:
an attraction point determination step of determining an attraction point in a current image that is a single image that makes up the moving image;
a corrected center position storage step of obtaining coordinates of a corrected center point of a previous image that is an image prior to the current image;
a correction center position determining step of determining a corrected center point in the current image, by setting a point on the image that is between the attraction point and the corrected center point of the previous image, and whose distance on the image from the corrected center point of the previous image is equal to or less than a limit value, as the corrected center point of the current image;
a correction parameter creation step of creating a correction parameter based on the corrected center point of the current image;
a correction step of correcting the current image based on the correction parameter; and
a display step of displaying the image that is obtained by correction in the correction step.

19. An integrated circuit that is used in a video signal display device for displaying a moving image that is made from a plurality of images, comprising:
an attraction point determination portion operable to determine an attraction point in a current image that is one of the images that make up the moving image;
a corrected center position storage portion operable to hold coordinates of a corrected center point of a previous image that is an image previous to the current image;
a corrected center position determination portion operable to determine a corrected center point in the current image, based on the attraction point that is determined by the attraction point determination portion and the corrected center point of the previous image that is held in the corrected center position storage portion;
a correction parameter creation portion operable to create a correction parameter based on the corrected center point of the current image; and
a correction portion operable to correct the current image based on the correction parameter;
wherein the corrected center position determination portion sets a point on the image that is between the attraction point and the corrected center point of the previous image, and whose distance on the image from the corrected center point of the previous image is equal to or less than a limit value, as the corrected center point of the current image; and
wherein the corrected center position storage portion stores the coordinates of the corrected center point of the current image that has been determined by the corrected center position determination portion.

* * * * *